United States Patent [19]

Boesen et al.

[11] 4,092,696
[45] May 30, 1978

[54] VARIABLE AREA CAPACITIVE PRESSURE TRANSDUCER WITH TEMPERATURE COMPENSATION

[75] Inventors: George Francis Boesen, Park Ridge; Peter Lawrence Kay, Arlington Heights, both of Ill.

[73] Assignee: Borg-Warner Corporation, Chicago, Ill.

[21] Appl. No.: 754,380

[22] Filed: Dec. 27, 1976

[51] Int. Cl.² .............................................. H01G 5/34
[52] U.S. Cl. ..................................... 361/283; 73/753; 361/274; 361/278
[58] Field of Search ................... 324/61 P; 73/398 C; 361/283, 290, 291, 278, 274

[56] References Cited

U.S. PATENT DOCUMENTS

| 2,439,047 | 4/1948 | Grinstead | 73/398 C |
| 3,222,581 | 12/1965 | Lenfant | 361/283 |
| 3,356,917 | 12/1967 | Goldstein | 361/290 |
| 3,796,968 | 3/1974 | Luscher | 361/290 X |
| 3,808,480 | 4/1974 | Johnston | 361/283 |

FOREIGN PATENT DOCUMENTS 411,619   3/1933   United Kingdom ................ 361/291

Primary Examiner—Elliot A. Goldberg
Attorney, Agent, or Firm—James J. Jennings, Jr.

[57] ABSTRACT

A variable area capacitive transducer has two electrodes, and the surface of one electrode is treated to provide it with a thin-film dielectric layer. One of the two electrodes has an apex point nearer the other electrode than the remainder of the electrode surface. As a force is applied to the deformable one of the two electrodes, there is a change in the effective contact area between the electrodes and a resultant change in capacitance. An electrical circuit is disclosed for translating this capacitance change into a d-c voltage change. Temperature compensation is provided for the transducer assembly.

7 Claims, 5 Drawing Figures

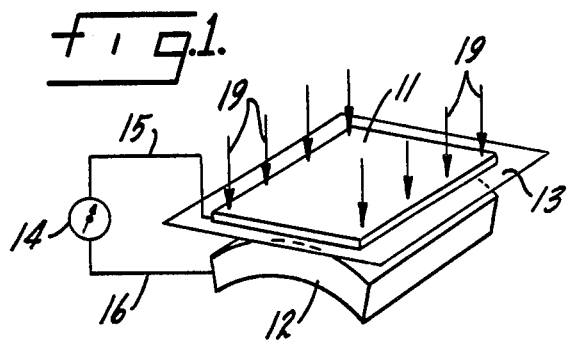
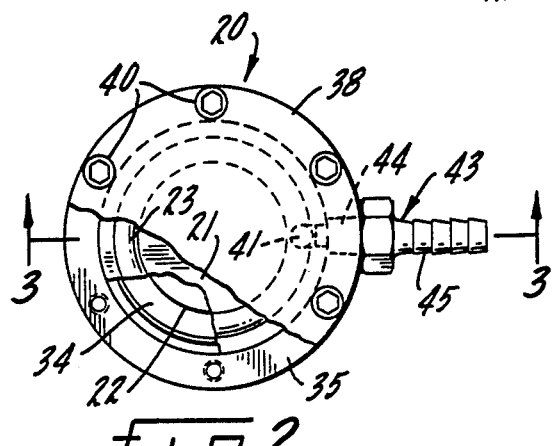
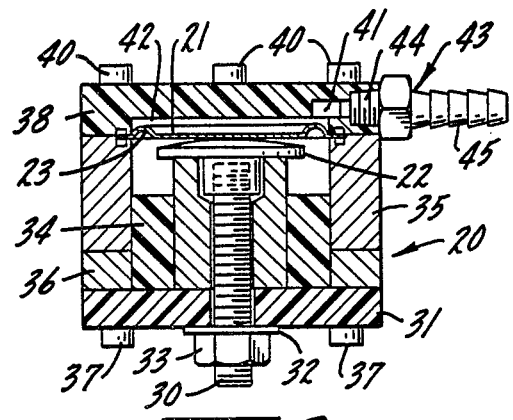
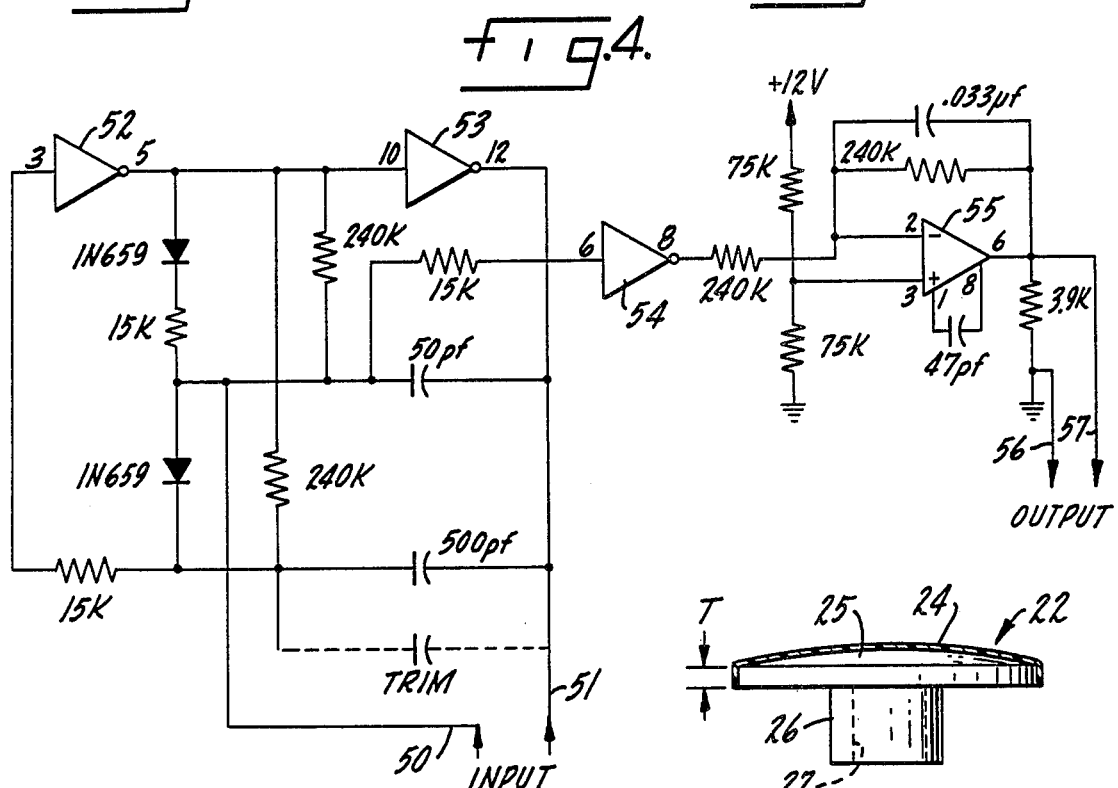
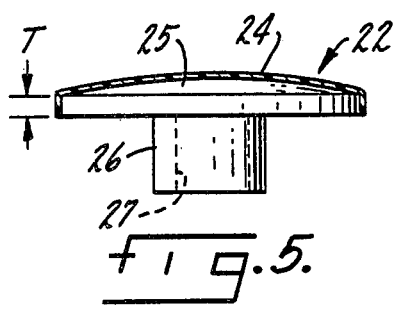

VARIABLE AREA CAPACITIVE PRESSURE TRANSDUCER WITH TEMPERATURE COMPENSATION

BACKGROUND OF THE INVENTION

In the field of pressure transducers, there are different types of resistive and capacitor units commonly available. Such arrangements usually respond to an applied force by producing a physical displacement, to provide an electrical signal. The resistance element can change a contact position as a function of pressure. The capacitive element generally has a pair or set of metallic surfaces which responds to the applied force by changing either the spacing or the effective surface area. However these prior art devices generally require a complex mechanical assembly, in that a precise air space is usually provided.

A variable area capacitive transducer is disclosed and claimed in the application of Allen D. Reich entitled "Variable Area Pressure Transducer", Ser. No. 750,047, filed Dec. 13, 1976, and assigned to the assignee of this invention. A primary object of this invention is the provision of temperature compensation for that pressure transducer.

SUMMARY OF THE INVENTION

A transducer assembly constructed in accordance with the teachings of the above-identified application comprises a first electrically conductive member, capable of deformation. A second electrically conductive member, substantially rigid and resistant to deformation, is spaced from the first member, and has an apex point on one surface. A thin-film dielectric layer is provided in the space between the first and second electrically conductive members or electrodes. A housing maintains the first and second electrodes in engagement.

In accordance with an important aspect of this invention, the first electrode includes a central area and a peripheral area with a corrugation or ridge extending adjacent the peripheral area of this electrode. When clamped about its periphery, this provides virtual isolation of the electrode central area by reason of the corrugation, and thus minimizes any undesired change in capacity as a function of temperature changes.

In accordance with another important aspect of this invention, the assembly includes a circular spacer member adjacent the bottom of the housing. This circular spacer is made of the same material, and has substantially the same thickness dimension, as the second electrode. This provides good temperature compensation for any variations in the second electrode over the operating range of the transducer.

THE DRAWING

In the several figures in the drawing, like reference numerals designate like components, and in that drawing:

FIG. 1 is a perspective illustration of a simplified transducer assembly, useful in understanding the principles of this invention;

FIG. 2 is a top view, partially broken away, of a transducer assembly constructed in accordance with the invention;

FIG. 3 is a sectional view, taken on the line 3—3 of FIG. 2, useful in understanding the component assembly of the invention;

FIG. 4 is a schematic diagram, illustrating one circuit arrangement for translating capacitance variations of the transducer assembly into related variations of a d-c voltage signal; and FIG. 5 is a side view of one electrode unit used with a preferred embodiment of the invention.

GENERAL TRANSDUCER DESCRIPTION

FIG. 1 depicts a model used in the laboratory for producing a change in capacitance responsive to a change in the applied force. A force, represented by the arrows 19, is applied to the edges of deflection plate 11, which is deformed by the application of this force. The lower member 12 represents a second plate, and in this illustration is a section cut from a constant radius cylinder. Both the plates 11, 12 are electrically conductive and thus are analagous to the plates of a capacitor. The second member 12 is substantially rigid or resistant to deformation. Means for establishing a dielectric layer between the plates 11, 12 includes a Mylar sheet 13, about 1 mil (0.001 inch) in thickness. The structure for retaining the dielectric layer abutting the plates 11, 12 is omitted from FIG. 1, the better to illustrate the basic principles.

With an increase of the force applied in FIG. 1, the resultant change in capacitance is observed on meter 14, coupled over line 15 to the upper plate 11 and over line 16 of the lower plate 12. The depicted arrangement successfully measured changes in pressure, as the pressure (or force) represented by the arrows 19 produced a change in the capacitance indicated by the meter 14.

DETAILED DESCRIPTION OF THE INVENTION

FIGS. 2 and 3 depict an embodiment of the invention built and successfully operated. As shown in these two figures, the transducer assembly 20 includes an upper capacitor plate 21 and a second or lower capacitor plate 22, supported in abutting relation. Upper plate 21 is the first electrically conductive member of the assembly. In the preferred embodiment it was constructed in a generally circular shape as shown, and formed of Ni-Span-C, a material exhibiting a very low thermal coefficient of elasticity. In accordance with an important aspect of this invention, the member 21 was formed with a dimple or corrugation 23 between the large, substantially flat central area and the outer peripheral area of this member, to assist in the thermal compensation of the complete unit. The second electrically conductive member 22 was made substantially rigid and resistant to deformation. In this embodiment, as better shown in FIG. 5, the member 22 is made of aluminum and anodized in a conventional manner to provide a dielectric layer 24 in a position where it is "sandwiched" between the two electrodes in the transducer assembly. The showing in FIG. 5 is approximately twice the scale of FIG. 3, and the scale of FIG. 3 is close to that actually used in the preferred embodiment. In the preferred embodiment the head or anvil 25 was formed with a curvature of the upper surface equal to a portion of a sphere having a five inch radius. The diameter of anvil 25 in the preferred embodiment was about 1 inch. The center post portion 26 was attached to the plate 22 to facilitate its mounting in the complete assembly. The center post is bored and tapped, as indicated at 27, to receive the threads of a fastener shown as a bolt 30, better shown in FIG. 3. In addition it is apparent that the thickness T of the electrode 22 can be varied in accordance with different structural requirements. In the preferred embodiment this dimension was about one-quarter inch.

As better illustrated in FIG. 3, bolt 30 extends from the lower portion of the post 26 through an insulating circular base member 31 of the transducer, and a washer 32 and nut 33 are affixed to the other end of the bolt 30. Those skilled in the art will appreciate that by adjusting the vertical position of the fastener 30, the initial contact area between the plates 21, 22 can be set, thus to provide for capacitance changes either as a function of increasing or decreasing pressure. The base 31 is made of a clear insulating plastic, or glass or ceramic, and a spacer 34 of Teflon or a similar insulating material is provided. The main assembly housing is a steel sleeve 35, formed like a section of a cylinder.

In accordance with another important aspect of this invention, a circular spacer member 36 is provided, and formed of aluminum (or whatever metal is used to make second electrode 22). It has been found that by making the vertical dimension of spacer 36 approximately equal to the vertical dimension T of the member 22 (FIG. 5), in conjunction with the corrugation of plate 21, good temperature compensation is provided for the complete assembly. The base member 31 of the assembly 20 is secured in place by a plurality of screws 37, which extend through base 31 and spacer 36, and are received in corresponding tapped holes in the housing 35.

Similarly at the top of the assembly is another plastic, insulating member 38 which functions as the cover plate. A plurality of additional screws 40 are provided to secure the cover plate 38 to the housing 35, clamping the outer periphery of the upper conductive member 21 firmly in place. The top plate 38 is cut out to define an opening 41 which communicates with the space 42 between the cover plate and the top of diaphragm 21. A hose connector 43 is provided, having a threaded portion 44 received in a tapped bore portion of the cover plate 38, and an outer projection 45 for receiving an air hose (not shown) or other suitable conduit. When assembled as shown any change in pressure applied to the connector 43 passes into the openings 41, 42 and is translated as a change in pressure between the cover plate 38 and the first electrically conductive member 21. This is turn produces a change in the area of contact between the members 21, 22 with a consequent change in the capacitance.

The schematic diagram of FIG. 4 depicts one circuit arrangement for producing a d-c output signal which varies as a function of the changing capacitance of the transducer assembly 20. As there shown the input signal to the circuit is received over conductors 50, 51. In practice one of these conductors is connected to the bolt 30 (FIG. 3) and thus makes electrical contact with the lower plate 22. The other lead was connected to the steel case 35, in physical engagement and thus electrical contact with upper plate 21. The variable area capacitance assembly thus is coupled in parallel with the 50 picofarad capacitor in the square wave astable multivibrator including the stages 52, 53. This results in the passage of a square wave signal over the buffer amplifier 54 to the integrating circuit including the IC stage 55, and the duty signal of the square wave applied over stage 54 to the integrating circuit varies as a function of the capacitance value present on the input lines 56, 57 having an amplitude proportional to the capacitance of the pressure transducer 20.

In an embodiment built and tested the stages 52, 53 and 54 were physically enclosed in a single IC package, a CD4007AE. This is a package with 14 pin connectors, and the pin numbers are given at the input and output connections of the stage 52-54. In addition the 1 and 5 pins were tied together, and the 8 and 13 pins were also tied together. The other stage 55 was a CA3130S, with the pin connections as shown. In addition a 12 volt supply was provided, with the positive polarity connections being coupled to the 2, 11 and 14 pins of the CD4007AE, and to the 7 pin of the CA3130S. The negative side of the power supply was coupled to the 4, 7 and 9 pin connections of the CD4007AE package and to the 4 pin of the CA3130S, as well as to the points referenced by the grounds symbols in FIG. 4. Other circuits may be designed to provide an effective output signal from the transducer assembly, but FIG. 4 illustrates one circuit by which those skilled in the art can implement the present invention in conjunction with a system requiring an electrical input signal.

TECHNICAL ADVANTAGES

The transducer assembly of the invention has been developed to withstand difficult environments, such as those found in the engine compartment of an automobile. The physical contact between the upper and lower capacitor plates, and removal of any requirement for maintaining an accurate dielectric spacing, contributes to the enhanced shock resistance. Measurements indicate that the change was accurate within $\pm 3\%$ over the temperature range of 0° to 100° C., and accurate to $\pm 6\%$ over the temperature range from $-40\%°$ to $+125°$ C. The circuit of FIG. 4 exhibited an accuracy of $\pm 2.5\%$, considering changes in the output signal voltage against changes of input capacitance, over the temperature range from $-40°$ to $+125°$ C. when energized a nominal 12 volt supply voltage. The transducer assembly was life tested to 100,000 cycles over the full pressure range, and its performance was stable to within 2%.

It is important to note that with the illustrated arrangement the maximum value of capacitance was about 200 picofarads. With conventional air dielectric transducers, the maximum value is about 20 picofarads. Thus the structure of the invention provides a much higher signal-to-noise ratio than has been possible with known arrangements.

It is important to emphasize that the efficacy of the present invention over a wide temperature range is due at least in part to the construction of the transducer assembly. In particular the corrugation which isolates the large central or operating area of the first electrode from its peripheral area, which is clamped in the housing, contributes to this end. In addition the circular spacer member positioned at the base of the housing, formed of the same material and having the same thickness as the second electrode, also contributes to this good temperature compensation.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A transducer assembly comprising:
   a first, substantially flat, electrically conductive member, capable of deformation, having a central area and a peripheral area, and having a corrugation adjacent its peripheral area;

a second electrically conductive member, substantially rigid and resistant to deformation, having an apex point on one surface;

a thin-film dielectric layer on one of the first and second electricallly conductive members; and a housing for maintaining the first electrically conductive member, the dielectric layer, and the second electrically conductive member in engagement, including means for clamping the peripheral area of the first member in a substantially rigid position, with the central area of the first member having physical contact with the dielectric layer at the apex point of the second electrically conductive member to provide a capacitor assembly, such that application of a force to the first electrically conductive member deforms the central area of this member to change the effective contact area of the first and second electrically conductive members.

2. A transducer assembly as claimed in claim 1, in which the first member is formed of steel.

3. A transducer assembly as claimed in claim 1, in which the second member is aluminum and the dielectric layer is formed by anodizing one surface of the aluminum member.

4. A transducer assembly comprising:

a first, substantially flat, electrically conductive member, capable of deformation, having a central area and a peripheral area, and having a corrugation adjacent its peripheral area;

a second electrically conductive member, substantially rigid and resistant to deformation, having an apex point on one surface;

a thin-film dielectric layer on one of the first and second electrically conductive members;

a housing for maintaining the first electrically conductive member, the dielectric layer, and the second electrically conductive member in engagement, including means for clamping the peripheral area of the first member in a substantially rigid position, with the central area of the first member having physical contact with the dielectric layer at the apex point of the second electrically conductive member to provide a capacitor assembly, such that application of a force to the first electrically conductive member deforms the central area of this member to change the effective contact area of the first and second electrically conductive members, characterized in that said second member has a given thickness dimension, and said housing is generally cylindrical, the peripheral area of said first member extends over the top edge of the housing, a cover plate is secured to the top of the housing to firmly grip the peripheral area of the first member, a circular spacer member is positioned adjacent the bottom of the housing, and a circular base member is secured to the housing to retain the circular spacer member in place, which circular spacer member is also formed of aluminum and has a thickness dimension substantially equal to the thickness dimension of the second electrically conductive member.

5. A transducer assembly comprising:

a generally cylindrical housing, having a circular upper surface and a circular lower surface;

a first, substantially flat, electrode, capable of deformation, having a central area, a peripheral area, and a corrugation adjacent its peripheral area, with its peripheral area resting on the housing's circular upper surface;

a cover plate, positioned over the peripheral area of the first electrode, to clamp the first electrode in position;

a second electrode, substantially rigid and resistant to deformation, having an apex point on one surface, and having a given thickness dimension;

a thin-film dielectric layer on the second electrode;

a circular base member defining a central opening;

a circular spacer member, of the same material as the second electrode and having a thickness dimension substantially equal to said given thickness dimension of the second electrode;

means for securing the circular spacer member against the circular lower surface of the cylindrical housing, and for securing the base member against the circular spacer member; and a fastener, having one end portion affixed to said second electrode and another end portion extending outwardly of the assembly through the base member opening, such that displacement of the fastener effects a change in the at-rest contact force between the first and second electrodes.

6. A transducer assembly as claimed in claim 5, in which said fastener is a bolt, and a nut is affixed to the portion of the bolt extending outwardly of the assembly to facilitate adjustment of the initial contact force between the electrodes.

7. A transducer assembly as claimed in claim 5, in which said cover plate defines a space between the top of the first electrode and the cover plate, and the cover plate further defines an opening in communication with said space, and a hose connector received in the cover plate in communication with said opening, such that any change in pressure applied to the hose connector changes the pressure between the cover plate and the first electrode, with a consequent change in the capacitance of the transducer assembly.

* * * * *